US012706229B2

(12) United States Patent
Tanaka et al.

(10) Patent No.: US 12,706,229 B2
(45) Date of Patent: Aug. 11, 2026

(54) MULTICORE CABLE-HAVING A STRANDED PAIR OF CORE ELECTRIC WIRES AND AN ADJACENT WIRE WITH A CONTROLLED DIAMETER RATIO

(71) Applicant: Sumitomo Electric Industries, Ltd., Osaka (JP)

(72) Inventors: Shigeyuki Tanaka, Osaka (JP); Yutaka Matsumura, Osaka (JP); Yoshitaka Ogasawara, Osaka (JP); Naoshi Yokoyama, Osaka (JP); Takumi Ooshima, Kanuma (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 141 days.

(21) Appl. No.: 18/558,047

(22) PCT Filed: Mar. 8, 2022

(86) PCT No.: PCT/JP2022/010095
§ 371 (c)(1),
(2) Date: Oct. 30, 2023

(87) PCT Pub. No.: WO2022/230372
PCT Pub. Date: Nov. 3, 2022

(65) Prior Publication Data

US 2024/0212878 A1 Jun. 27, 2024

(30) Foreign Application Priority Data

Apr. 30, 2021 (JP) ................................ 2021-077349

(51) Int. Cl.
*H01B 7/02* (2006.01)
*H01B 7/00* (2006.01)
(Continued)

(52) U.S. Cl.
CPC ......... *H01B 7/0225* (2013.01); *H01B 7/0009* (2013.01); *H01B 13/0221* (2013.01); *H01B 13/141* (2013.01)

(58) Field of Classification Search
CPC . H01B 3/30; H01B 3/306; H01B 3/44; H01B 3/441; H01B 3/447; H01B 7/009;
(Continued)

(56) References Cited

U.S. PATENT DOCUMENTS 10,566,107 B2 * 2/2020 Kohori .................. H01B 3/447
2015/0096785 A1 * 4/2015 Hayashishita ......... H01B 11/20 174/113 R (Continued)

FOREIGN PATENT DOCUMENTS

JP 2017-147067 A 8/2017
JP 2018-032515 A 3/2018
JP 2018-046616 A 3/2018
JP 2020-087697 A 6/2020

*Primary Examiner* — William H. Mayo, III
(74) *Attorney, Agent, or Firm* — Volpe Koenig

(57) ABSTRACT

A multicore cable includes a first core wire and a first sheath layer disposed around the first core wire. The first core wire is composed of a pair of first core electric wires and a wire that are stranded together. Each first core electric wire includes a first conductor and a first insulating layer covering an outer surface of the first conductor. In one configuration, the wire is a stranded core electric wire including a second core wire and a second sheath layer disposed around the second core wire, the second core wire being composed of a plurality of third core electric wires that are stranded together, each third core electric wire including a third conductor and a third insulating layer.

6 Claims, 4 Drawing Sheets

(51) Int. Cl.
*H01B 13/02* (2006.01)
*H01B 13/14* (2006.01)

(58) Field of Classification Search
CPC ...... H01B 7/0045; H01B 7/02; H01B 7/0216; H01B 7/0225; H01B 7/0275; H01B 7/18; H01B 7/187; H01B 7/1875; H01B 7/226; H01B 7/28; H01B 7/295; H01B 9/02; H01B 9/024; H01B 9/11; H01B 11/002; H01B 11/02; H01B 11/18; H01B 11/20; H01B 13/0221; H01B 13/14; H01B 13/141; H01B 13/2606; B60R 16/02; B60R 16/0215; B60R 16/0207; B60R 16/023
USPC ................... 174/110 R–113 R, 120 R–122 R
See application file for complete search history.

(56) References Cited

U.S. PATENT DOCUMENTS

| | | | | |
|---|---|---|---|---|
| 2017/0229212 | A1* | 8/2017 | Hayakawa | H01B 7/0045 |
| 2017/0236617 | A1 | 8/2017 | Hayakawa et al. | |
| 2018/0005723 | A1* | 1/2018 | Kohori | H01B 3/30 |
| 2018/0025808 | A1* | 1/2018 | Hashimoto | H01B 7/295<br>174/113 R |
| 2018/0061525 | A1 | 3/2018 | Kohori et al. | |
| 2019/0074110 | A1* | 3/2019 | Niwata | H01B 3/306 |
| 2019/0198193 | A1* | 6/2019 | Tanaka | H01B 7/28 |
| 2019/0228874 | A1* | 7/2019 | Kohori | H01B 11/02 |
| 2020/0168358 | A1* | 5/2020 | Hayakawa | B60R 16/0215 |
| 2021/0151221 | A1* | 5/2021 | Huang | H01B 13/2606 |
| 2021/0313090 | A1 | 10/2021 | Hayakawa et al. | |

* cited by examiner

MULTICORE CABLE-HAVING A STRANDED PAIR OF CORE ELECTRIC WIRES AND AN ADJACENT WIRE WITH A CONTROLLED DIAMETER RATIO

TECHNICAL FIELD

The present disclosure relates to a multicore cable.

This application claims priority to Japanese Patent Application No. 2021-077349 filed Apr. 30, 2021, which is incorporated herein by reference in its entirety.

BACKGROUND ART

PTL 1 discloses a core electric wire used in automotive multicore cables for electronic parking brakes (EPBs), wheel speed sensors, or other systems. The core electric wire has a conductor and two insulating layers covering the conductor and made of resins. One of the insulating layers contains a copolymer of ethylene and an α-olefin having a carbonyl group, and the other insulating layer contains a polyolefin or a fluororesin.

CITATION LIST

Patent Literature

PTL 1: Japanese Unexamined Patent Application Publication No. 2018-032515

SUMMARY OF INVENTION

A multicore cable according to an aspect of the present disclosure includes: a core wire made by stranding a pair of first core electric wires and a wire; and a sheath layer disposed around the core wire, wherein the first core electric wires each include a conductor and an insulating layer covering an outer surface of the conductor, and a ratio d2/d1 of an average outer diameter d2 of the wire to an average outer diameter d1 of each first core electric wire is more than 0.5 and less than 2.0.

DESCRIPTION OF EMBODIMENTS

Figure 1:
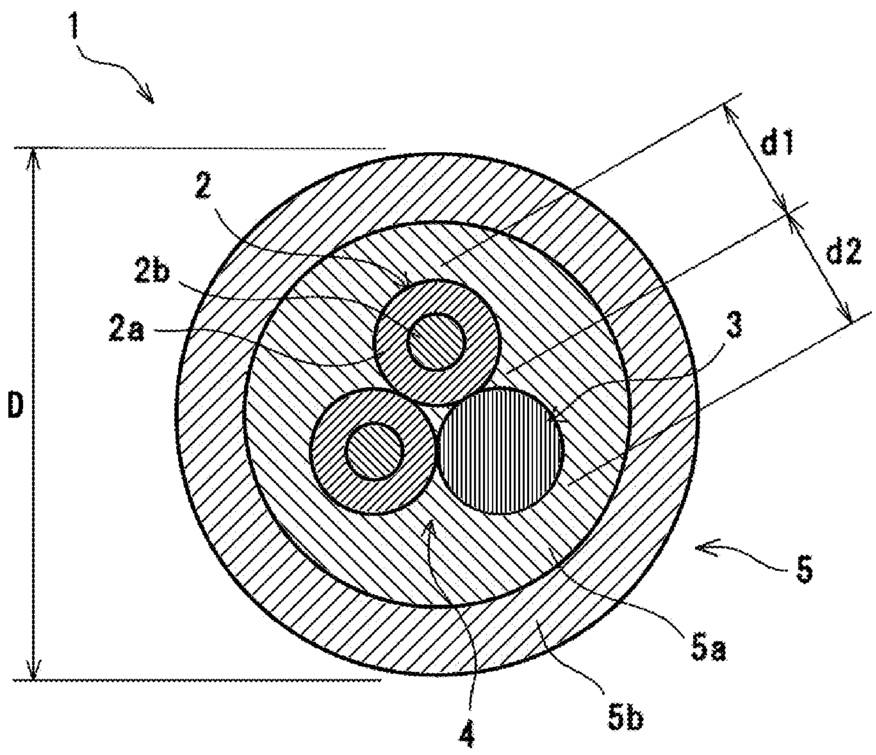
FIG. 1 is a schematic cross-sectional view of a multicore cable according to an embodiment of the present disclosure.

Problems to be Solved by Present Disclosure

Automotive multicore cables for electronic parking brakes, wheel speed sensors, or other systems are complicatedly flexed during handling in vehicles, driving of actuators, or other operations. Such an automotive multicore cable thus requires high flex resistance. There is also a need to easily remove a sheath layer at terminals of multicore cables (hereinafter also referred to as "good terminal processability") to improve workability.

The present disclosure has been made in light of the foregoing circumstances and aims at providing a multicore cable having high flex resistance and good terminal processability.

ADVANTAGEOUS EFFECTS OF PRESENT DISCLOSURE

A multicore cable according to an aspect of the present disclosure has high flex resistance and good terminal processability.

DESCRIPTION OF EMBODIMENTS OF PRESENT DISCLOSURE

First, embodiments of the present disclosure are listed and described.

A multicore cable according to an aspect of the present disclosure includes: a core wire made by stranding a pair of first core electric wires and a wire; and a sheath layer disposed around the core wire, wherein the first core electric wires each include a conductor and an insulating layer covering an outer surface of the conductor, and a ratio d2/d1 of an average outer diameter d2 of the wire to an average outer diameter d1 of each first core electric wire is more than 0.5 and less than 2.0.

The multicore cable has high flex resistance and good terminal processability when the ratio d2/d1 of the average outer diameter d2 of the wire to the average outer diameter d1 of each first core electric wire is more than 0.5 and less than 2.0. The "flex resistance" refers to the ability of an electric wire or cable to withstand repeated flex with no break in conductor. The multicore cable also has high flex resistance at low temperature. The "low temperature" refers to a temperature range of 0° ° C. or lower.

The wire is preferably a second core electric wire including a conductor and an insulating layer covering the outer surface of the conductor. In this case, the multicore cable has a symmetric cross section, and the multicore cable has higher flex resistance.

Preferably, the wire is a stranded core electric wire including a core wire made by stranding multiple third core electric wires and a sheath layer disposed around the core wire, and the third core electric wires each include a conductor and an insulating layer covering the outer surface of the conductor. In this, the multicore cable has still higher flex resistance.

The ratio D/d1 of the average outer diameter D of the multicore cable to the average outer diameter d1 of each first core electric wire is preferably more than 2.7 and less than 4.0. This configuration can promote the effect of improving the flex resistance and terminal processability of the multicore cable.

The multicore cable is suitably used as an automotive cable.

Details of Embodiments of Present Disclosure

A multicore cable according to an embodiment of the present disclosure will be described below with reference to the drawings.

<Multicore Cable>

A multicore cable 1 shown in FIG. 1 includes: a core wire 4 made by stranding a pair of core electric wires 2 and a wire 3; and a sheath layer 5 disposed around the core wire 4. The multicore cable 1 can be suitably used as an automotive cable. Specific applications include electric parking brakes (EPBs), wheel speed sensors, and in-wheel motors.

The multicore cable 1 may have any cross-sectional shape and has, for example, a circular cross section. The average outer diameter D of the multicore cable 1 can be appropriately designed according to the application. The lower limit of the average outer diameter D is, for example, 6 mm, preferably 8 mm, and the upper limit of the average outer diameter D is, for example, 16 mm, preferably 12 mm. The "average outer diameter" refers to the average value of the outer diameter of the cross section at freely selected ten points. For example, if the cross section is flat, and the measured diameter varies depending on how the diameter is taken, the average value of the maximum outer diameter and the minimum outer diameter is regarded as the outer diameter.

In the multicore cable 1, the ratio d2/d1 of the average outer diameter d2 of the wire 3 to the average outer diameter d1 of each core electric wire 2 is more than 0.5 and less than 2.0. With the ratio d2/d1 in the above range, the multicore cable 1 has high flex resistance and good terminal processability. The reason for this is not necessarily clear, but may be that, with the ratio d2/d1 in the above range, the core wire 4 has a uniform cross-sectional shape, and the bunch stranded structure of the core wire 4 is hardly distorted when the multicore cable 1 is flexed, resulting in high flex resistance. When the core wire 4 has a uniform cross-sectional shape, the sheath layer 5 has a constant thickness in the circumferential direction, and the depth of blade insertion is constant in removing the sheath layer 5, resulting in good terminal processability.

The lower limit of the ratio d2/d1 is preferably 0.7, more preferably 0.8, still more preferably 1.0. The upper limit of the ratio d2/d1 is preferably 1.7, more preferably 1.5, still more preferably 1.3. With the ratio d2/d1 in the above range, the multicore cable 1 has higher flex resistance and better terminal processability. In addition, the space inside the sheath layer 5 can be reduced to improve the stability of the cross-sectional shape.

In the multicore cable 1, the ratio D/d1 of the average outer diameter D of the multicore cable 1 to the average outer diameter d1 of each core electric wire 2 is preferably more than 2.7 and less than 4.0. With the ratio D/d1 in the above range, the multicore cable 1 has higher flex resistance and better terminal processability. The lower limit of the ratio D/d1 is more preferably 2.8, still more preferably 3.0. With the ratio D/d1 greater than or equal to the lower limit, the multicore cable 1 has higher flex resistance. The upper limit of the ratio D/d1 is more preferably 3.7, still more preferably 3.5. With the ratio D/d1 less than or equal to the upper limit, the multicore cable 1 has higher terminal processability.

[Core Wire]

The core wire 4 is a bunch stranded wire made by stranding a pair of core electric wires 2 and a wire 3.

(Core Electric Wire)

The core electric wires 2 each include a conductor **2*b* and an insulating layer 2*a* covering the outer surface of the conductor 2*b*. The pair of core electric wires 2 has the same average outer diameter. The "same" in this case means that a difference in average outer diameter between the pair of core electric wires 2 is 5% or less of the outer diameter of the smaller core electric wire 2**.

The lower limit of the average outer diameter d1 of each core electric wire 2 is, for example, 1.3 mm, preferably 2.0 mm, and the upper limit is, for example, 5.0 mm, preferably 4.5 mm.

The conductor **2*b* is a conductor made by stranding multiple element wires at a constant pitch. Examples of the element wires include, but are not limited to, copper wires, copper alloy wires, aluminum wires, and aluminum alloy wires. The conductor 2*b*** is preferably a stranded stranded wire made by stranding multiple stranded element wires each made by stranding multiple element wires. The stranded element wires to be stranded preferably have the same number of element wires.

The lower limit of the average diameter of each element wire is preferably 40 μm, more preferably 50 μm, still more preferably 60 μm. The upper limit of the average diameter of each element wire is preferably 100 μm, more preferably 90 μm. The average diameter of each element wire refers to the average diameter of the element wire at freely selected three points as measured by using a micrometer with both columnar ends.

The number of element wires is appropriately designed according to, for example, the application of the multicore cable 1 or the diameter of the element wires. The lower limit of the number of element wires is preferably 196, more preferably 294. The upper limit of the number of element wires is preferably 2450, more preferably 2000. Examples of the stranded stranded wire include a stranded stranded wire having 196 element wires and made by stranding 7 stranded element wires each made by stranding 28 element wires, a stranded stranded wire having 294 element wires and made by stranding 7 stranded element wires each made by stranding 42 element wires, a stranded stranded wire having 380 element wires and made by stranding 19 stranded element wires each made by stranding 20 element wires, a stranded stranded wire having 1568 element wires and made by stranding 7 stranded stranded wires each having 224 element wires and each made by stranding 7 stranded element wires each made by stranding 32 element wires, and a stranded stranded stranded wire having 2450 element wires and made by stranding 7 stranded stranded wires each having 350 element wires and each made by stranding 7 stranded element wires each made by stranding 50 element wires.

The lower limit of the average area (including spaces between the element wires) of the cross section of the conductor **2*b* is preferably 1.0 $mm^2$, more preferably 1.5 $mm^2$, still more preferably 1.8 $mm^2$, yet still more preferably 2.0 $mm^2$. The upper limit of the average area of the cross section of the conductor 2*b* is preferably 3.0 $mm^2$, more preferably 2.8 $mm^2$. The average area of the cross section of the conductor 2*b* refers to the area calculated from the average outer diameter defined as the average value of the outer diameter of the conductor 2*b*** at freely selected three points measured by using a caliper, taking care not to deform the stranded structure under pressure.

The insulating layer **2*a* is composed of an insulating layer-forming composition containing a synthetic resin as a main component and disposed on the outer surface of the conductor 2*b* to cover the conductor 2*b*. The "main component" refers to a substance that is contained in the largest amount in the insulating layer 2*a*. The average thickness of the insulating layer 2*a*** is not limited and is, for example, 0.1 mm to 5 mm. The "average thickness" refers to the average value of the thickness measured at freely selected ten points.

The synthetic resin, which is the main component of the insulating layer **2*a*, may be cross-linked by, for example, electron beam irradiation. When the main component of the insulating layer 2***a* is a cross-linked synthetic resin, the insulating layer 2*a* is unlikely to deform with heat during extrusion of the sheath layer 5 or other processes in the manufacture of the multicore cable 1. The cross-linking can be performed by exposing the insulating layer-forming composition to ionizing radiation. Examples of ionizing radiation include γ-rays, electron beams, X-rays, neutron beams, and high-energy ion beams. The lower limit of the exposure dose of ionizing radiation is preferably 10 kGy, more preferably 30 kGy. The upper limit of the exposure dose of ionizing radiation is preferably 300 kGy, more preferably 240 kGy.

Examples of the synthetic resin include polyvinyl chloride, polyolefin resins, and polyurethane resins. Examples of the polyolefin resins include polypropylene (e.g., homopolymer, block polymer, random polymer), polypropylene thermoplastic elastomer, reactor-type polypropylene thermoplastic elastomer, and dynamic cross-linked polypropylene thermoplastic elastomer; and polyethylene resins, such as polyethylene (e.g., high-density polyethylene, linear low-density polyethylene, low-density polyethylene, ultra-low-density polyethylene), ethylene-vinyl acetate copolymer, ethylene-ethyl acrylate copolymer, ethylene-methyl methacrylate copolymer, ethylene-methyl acrylate copolymer, ethylene-methyl methacrylate copolymer, ethylene-ethyl acrylate copolymer, ethylene-butyl acrylate copolymer, ethylene-propylene rubber, ethylene acrylic rubber, ethylene-glycidyl methacrylate copolymer, and ethylene-methacrylic acid copolymer. Examples of the polyolefin resins further include ionomer resins in which the molecules of copolymers, such as ethylene-methacrylic acid copolymers and ethylene-acrylic acid copolymers, are bonded to each other with metal ions, such as sodium and zinc. These resins may be modified with maleic anhydride or other compounds. These resins may have an epoxy group, an amino group, an imide group, or other groups.

The lower limit of the product C×E of the coefficient of linear expansion C from −35° C. to 25° C. and the elastic modulus E at −35° C. of the insulating layer 2*a* is preferably 0.01 $MPaK^{-1}$. The upper limit of the product C×E is preferably 0.9 $MPaK^{-1}$. The product C×E can be adjusted by controlling the type and amount of synthetic resin, the presence or absence of additives, and other parameters.

The lower limit of the coefficient of linear expansion C from −35° C. to 25° C. of the insulating layer 2*a* is preferably $1.0\times10^{-5}\ K^{-1}$, more preferably $1.0\times10{+}K^{-1}$. The upper limit of the coefficient of linear expansion C of the insulating layer 2*a* is preferably $2.5\times10^{-4}\ K^{-1}$, more preferably $2.0\times10^{-4}\ K^{-1}$. The "coefficient of linear expansion" is a value calculated from dimensional changes of a thin plate against temperature changes measured by using a viscoelastic analyzer ("DVA-220" available from IT Keisoku Co., Ltd.) in a tensile mode in a temperature range from −100° ° C. to 200° C. at a heating rate of 5° C./min, a frequency of 10 Hz, and a strain of 0.05% in accordance with the determination of dynamic mechanical properties described in JIS-K7244-4 (1999).

The lower limit of the elastic modulus E at −35° C. of the insulating layer 2*a* is preferably 1,000 MPa, more preferably 2,000 MPa. The upper limit of the elastic modulus E of the insulating layer 2*a* is preferably 3,500 MPa, more preferably 3,000 MPa. The "elastic modulus" is a storage modulus measured by using the viscoelastic analyzer in a tensile mode in a temperature range from −100° ° C. to 200° C. at a heating rate of 5° C./min, a frequency of 10 Hz, and a strain of 0.05% in accordance with the determination of dynamic mechanical properties described in JIS-K7244-4 (1999).

The insulating layer 2*a* may contain additives, such as flame retardants, flame retardant aids, antioxidants, lubricants, colorants, reflection-imparting agents, masking agents, processing stabilizers, and plasticizers. Examples of flame retardants include halogenated flame retardants, such as brominated flame retardants and chlorinated flame retardants; and non-halogenated flame retardants, such as metal hydroxides, nitrogen flame retardants, and phosphorus flame retardants. Flame retardants can be used singly or in combination of two or more.

(Wire)

The wire 3 differs from the pair of core electric wires 2 in the core wire 4. Examples of the wire 3 include a core electric wire different from the core electric wires 2, a stranded core electric wire made by stranding multiple core electric wires, and a dummy wire, such as a resin rod.

The lower limit of the average outer diameter d2 of the wire 3 is not limited as long as the average outer diameter d2 of the wire 3 and the average outer diameter d1 of each core electric wire 2 satisfy the ratio d2/d1 in the above range. The lower limit is, for example, 1.3 mm, preferably 2.0 mm, and the upper limit is, for example, 5.0 mm, preferably 4.5 mm.

Figure 2:
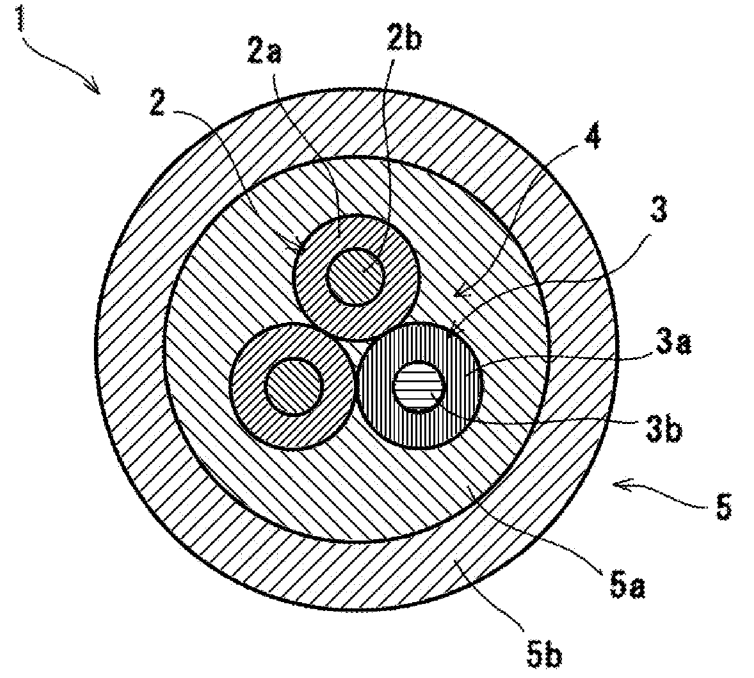
FIG. 2 is a schematic cross-sectional view of a multicore cable according to an embodiment of the present disclosure.

When the wire 3 is a core electric wire different from the core electric wires 2, the core electric wire preferably includes, for example, a conductor 3*b* and an insulating layer 3*a* covering the outer surface of the conductor, as shown in FIG. 2. The conductor 3*b* may be, for example, the same conductor as the conductor 2*b*. The insulating layer 3*a* may be, for example, the same insulating layer as the insulating layer 2*a*.

Figure 3:
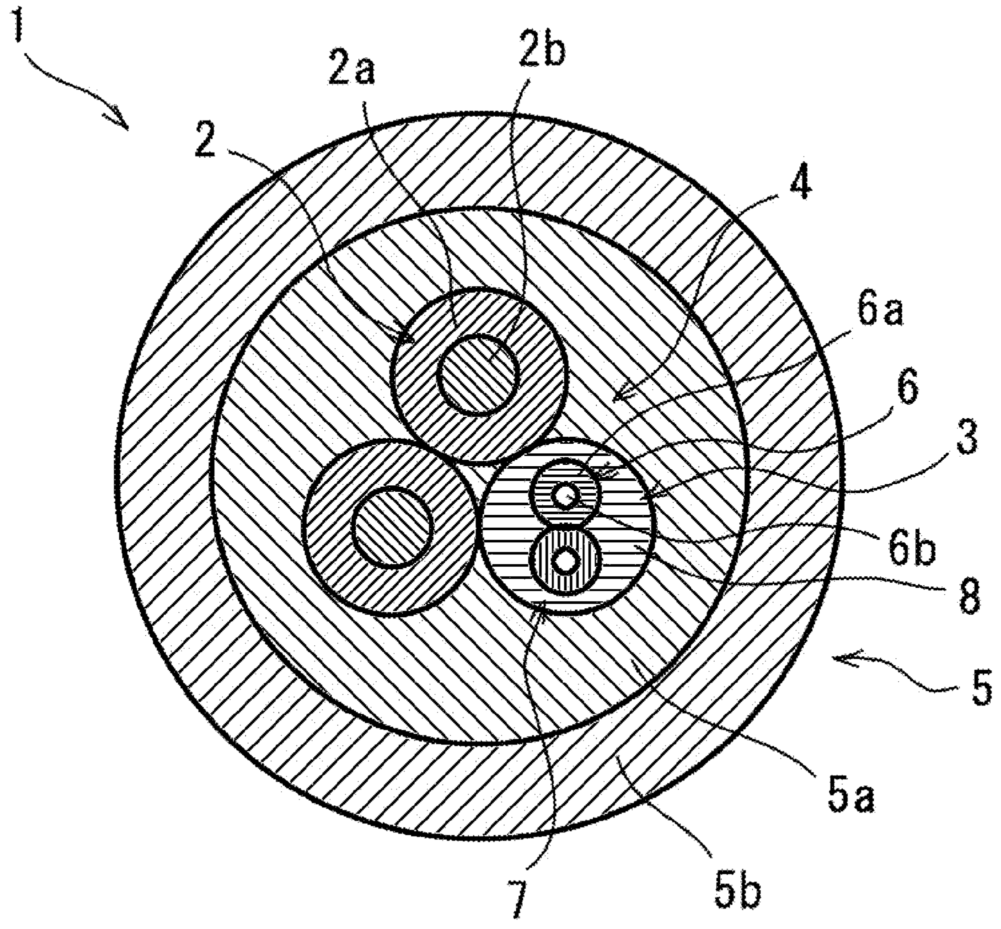
FIG. 3 is a schematic cross-sectional view of a multicore cable according to an embodiment of the present disclosure.

When the wire 3 is a stranded core electric wire made by stranding multiple core electric wires, for example, as shown in FIG. 3, the stranded core electric wire preferably includes a core wire 7 made by stranding multiple core electric wires 6 and a sheath layer 8 disposed around the core wire, and each core electric wire 6 preferably includes a conductor 6*b* and an insulating layer 6*a* covering the outer surface of the conductor. The conductor 6*b* may be, for example, the same conductor as the conductor 2*b*. The insulating layer 6*a* may be, for example, the same insulating layer as the insulating layer 2*a*. The sheath layer 8 may be, for example, the same sheath layer as an outer sheath layer 5*b* described below.

When the wire 3 is a dummy wire, such as a resin rod, the resin rod may be made of, for example, polyethylene or polypropylene.

[Sheath Layer]

The sheath layer 5 has a two-layer structure including an inner sheath layer 5*a* disposed on the outer side of the core wire 4 and the outer sheath layer 5*b* disposed on the outer surface of the inner sheath layer 5*a*.

The main component of the inner sheath layer 5*a* is any synthetic resin having flexibility. Examples of the main component of the inner sheath layer 5*a* include polyolefins, such as polyethylene and ethylene-vinyl acetate copolymer (EVA), polyurethane elastomers, and polyester elastomers. These compounds may be used as a mixture of two or more.

The lower limit of the minimum thickness of the inner sheath layer 5*a* (the minimum distance between the core wire 4 and the outer surface of the inner sheath layer 5*a*) is preferably 0.3 mm, more preferably 0.4 mm. The upper limit of the minimum thickness of the inner sheath layer 5*a* is preferably 0.9 mm, more preferably 0.8 mm.

The main component of the outer sheath layer 5*b* is any synthetic resin having high flame retardancy and high wear resistant. Examples of the main component of the outer sheath layer 5*b* include polyurethane.

The average thickness of the outer sheath layer 5*b* is preferably 0.3 mm to 0.7 mm.

The inner sheath layer 5*a* and the outer sheath layer 5*b* preferably each have the resin component cross-linked. The cross-linking method for the inner sheath layer 5*a* and the outer sheath layer 5*b* may be the same as the cross-linking method for the insulating layer 2*a*. The inner sheath layer 5*a* and the outer sheath layer 5*b* may contain the additives illustrated for the insulating layer 2*a*.

It is noted that a tape member, such as paper or non-woven fabric, may be wound, as a holding member, between the core wire 4 and the sheath layer 5.

<Method of Manufacturing Multicore Cable>

The multicore cable 1 can be produced by a manufacturing method including a step of stranding a pair of core electric wires 2 and a wire 3 (stranding step) and a step of providing the sheath layer 5 for coating on the outer side of the core wire 4 made by stranding the pair of core electric wires 2 and the wire 3 (sheath layer for coating-providing step).

Figure 4:
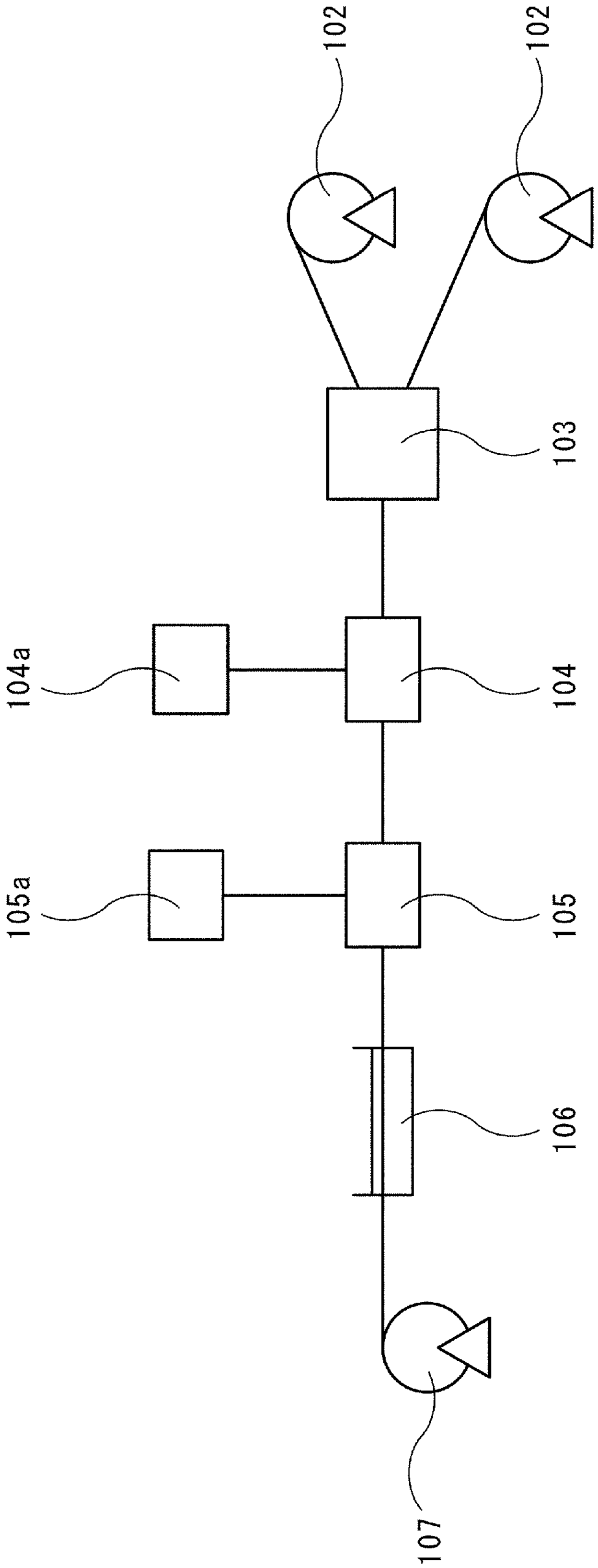
FIG. 4 is a schematic view of an apparatus for manufacturing a multicore cable according to an embodiment of the present disclosure.

The method of manufacturing the multicore cable can be carried out by using, for example, a multicore cable manufacturing apparatus shown in FIG. 4. The multicore cable manufacturing apparatus mainly includes multiple supplying reels 102, a stranding unit 103, an inner sheath layer coating unit 104, an outer sheath layer coating unit 105, a cooling unit 106, and a cable winding reel 107.

(Stranding Step)

In the stranding step, the pair of core electric wires 2 and the wire 3 wound around the multiple supplying reels 102 are supplied to the stranding unit 103, and the pair of core electric wires 2 and the wire 3 are stranded in the stranding unit 103 to form the core wire 4.

(Sheath Layer Coating Step)

In the sheath layer coating step, the inner sheath layer coating unit 104 extrudes a resin composition, which is used for forming the inner sheath layer and stored in a reservoir 104*a*, on the outer side of the core wire 4 formed in the stranding unit 103. The outer side of the core wire 4 is accordingly coated with the inner sheath layer 5*a*.

After the coating with the inner sheath layer 5*a*, the outer sheath layer coating unit extrudes a resin composition, which is used for forming the outer sheath layer and stored in a reservoir 105*a*, on the outer surface of the inner sheath layer 5*a*. The outer surface of the inner sheath layer 5*a* is accordingly coated with the outer sheath layer 5*b*.

After the coating with the outer sheath layer 5*b*, the sheath layer 5 is cured by cooling the core wire 4 in the cooling unit 106 to produce the multicore cable 1. The multicore cable 1 is wound and collected on the cable winding reel 107.

The method of manufacturing the multicore cable may further include a step of cross-linking the resin component of the sheath layer 5 (cross-linking step). The cross-linking step may be performed before the core wire 4 is coated with the compositions for forming the sheath layer 5 or after the coating (after the sheath layer 5 is formed).

The cross-linking can be performed in the same manner as the exposure of the insulating layer-forming composition to ionizing radiation in the insulating layer 2*a* of the multicore cable 1.

Other Embodiments

It should be understood that the embodiments disclosed herein are illustrative in any respect and non-restrictive. The scope of the present disclosure is not limited to the configurations of the embodiments described above, but defined by the claims and intended to include all modifications within the meaning and range of equivalency of the claims.

The sheath layer 5 of the multicore cable 1 may be a single layer or may have a multilayer structure including two or more layers.

The multicore cable 1 may include other layers between the core wire 4 and the sheath layer 5 or on the outer surface of the sheath layer 5. Examples of other layers between the core wire 4 and the sheath layer 5 include a holding member layer, such as a paper tape layer or a non-woven fabric layer. Examples of other layers disposed on the outer surface of the sheath layer 5 include a shield layer.

Examples

The present invention will be described in more detail below by way of Examples, but the present invention is not limited to these Examples.

[Production of Core Electric Wire]

An insulating layer-forming composition was prepared by mixing 100 parts by mass of ethylene-ethyl acrylate copolymer, 70 parts by mass of a flame retardant, and 2 parts by mass of an antioxidant, and extruded on the outer surface of a conductor (average diameter: 2.4 mm) made by stranding 7 stranded element wires each made by stranding 72 annealed copper element wires each having an average diameter of 80 μm to form an insulating layer, whereby a core electric wire having an average outer diameter d1 of 3.0 mm was produced. The insulating layer was exposed to electron beam irradiation at 60 kGy to cross-link the resin component. The ethylene-ethyl acrylate copolymer used to prepare the insulating layer-forming composition is "DPDJ-6182" (ethyl acrylate content: 15 mass %) available from ENEOS NUC Corporation, the flame retardant is aluminum hydroxide ("HIGILITE (registered trademark) H-31" available from Showa Denko K.K.), and the antioxidant is "IRGANOX (registered trademark) 1010" available from BASF.

[Production of Wire]

A wire having the average outer diameter d2 shown in Table 1 below was produced by extruding cross-linked polyurethane on the outer surface of a conductor (average diameter: 0.72 mm) made by stranding 60 copper alloy element wires each having an average diameter of 80 μm to form an insulating layer.

[Production of Multicore Cable]

A pair of the core electric wires produced above and the wire produced above were stranded to form a core wire, and the core wire was coated with a sheath layer by extrusion to produce multicore cables Nos. 1 to 14 having the average outer diameters D shown in Table 1 below. The sheath layer was a layer containing a cross-linked polyurethane having flame retardancy as a main component. The resin component of the sheath layer was cross-linked by electron beam irradiation at 180 kGy.

[Flex Resistance]

Figure 5:
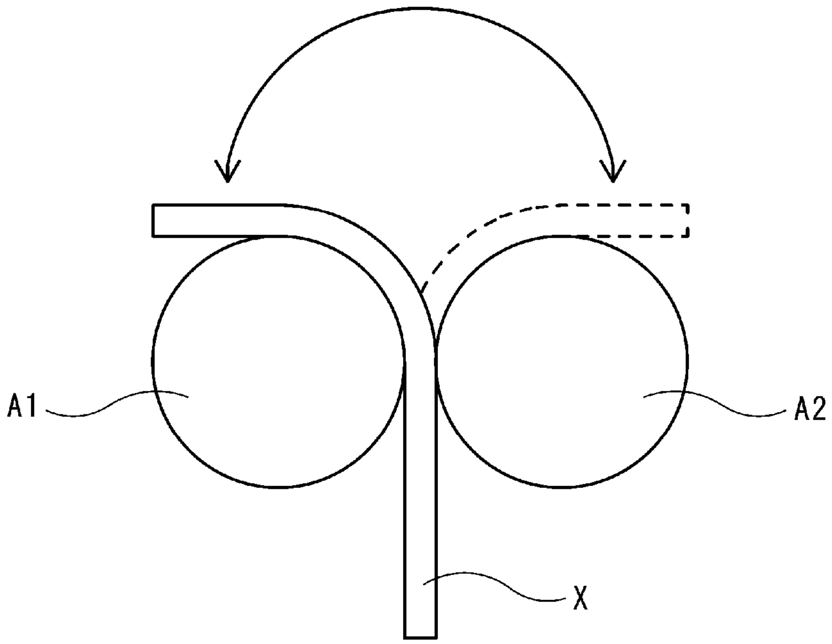
FIG. 5 is a schematic view for describing a flex test in Examples.

Referring to FIG. 5, each of the multicore cables X Nos. 1 to 14 was vertically placed between two mandrels each having a diameter of 60 mm arranged horizontally and parallel to each other. The multicore cable X was repeatedly flexed at 90° in the horizontal direction such that the upper end of the multicore cable X came into contact with the upper side of one mandrel A1 and then flexed at 90° in the opposite direction such that the upper end came into contact with the upper side of the other mandrel A2. The test conditions were as follows: a downward load of 2 kg applied to the lower end of the multicore cable X; a temperature of −30° C.; and a flex rate of 60 times/min. In the test, the flex number until a break (non-conductive state) in the multicore cable was counted. The results are shown in Table 1 below. The flex resistance was rated as "good" when the flex number was 30,000 or more and "poor" when the flex number was less than 30,000.

[Terminal Processability]

The sheath layer of each multicore cable was cut with a V-shaped blade, and the load in removing the sheath layer was measured with a load cell. The results are shown in Table 1 below. The terminal processability was rated as "good" when the load was 40 N or less and "poor" when the load was more than 40 N.

[Comprehensive Evaluation]

The multicore cables were comprehensively evaluated on the basis of two items, flex resistance and terminal processability. The multicore cables were rated as "A" (good) when two items were both "good", "B" (moderate) when one of two items was "good" and the other was "poor", and "C" (poor) when two items were both "poor". The multicore cables rated as "B" or higher in the comprehensive evaluation were accepted products.

3*b* conductor
4 core wire
5 sheath layer
5*a* inner sheath layer
5*b* outer sheath layer
6 core electric wire
6*a* insulating layer
6*b* conductor
7 core wire
8 sheath layer
d1 average outer diameter of core electric wire 2
d2 average outer diameter of wire 3
D average outer diameter of multicore cable 1
102 supplying reel
103 stranding unit
104 inner sheath layer coating unit
104*a*, 105*a* reservoir
105 unit providing outer sheath layer for coating
106 cooling unit
107 cable winding reel
A1, A2 mandrel
X multicore cable

TABLE 1

| | No. 1 | No. 2 | No. 3 | No. 4 | No. 5 | No. 6 | No. 7 | No. 8 | No. 9 | No. 10 | No. 11 | No. 12 | No. 13 | No. 14 |
|---|---|---|---|---|---|---|---|---|---|---|---|---|---|---|
| Average outer diameter d1 (mm) of core electric wire | 3.0 | 3.0 | 3.0 | 3.0 | 3.0 | 3.0 | 3.0 | 3.0 | 3.0 | 3.0 | 3.0 | 3.0 | 3.0 | 3.0 |
| Average outer diameter d2 (mm) of wire | 4.0 | 4.5 | 5.0 | 6.0 | 3.0 | 2.5 | 2.0 | 1.5 | 4.0 | 4.0 | 4.0 | 4.0 | 4.0 | 4.0 |
| Average outer diameter D (mm) of multicore cable | 9.8 | 9.8 | 9.8 | 9.8 | 9.8 | 9.8 | 9.8 | 9.8 | 10.5 | 11.0 | 12.0 | 9.0 | 8.5 | 8.0 |
| d2/d1 | 1.3 | 1.5 | 1.7 | 2.0 | 1.0 | 0.8 | 0.7 | 0.5 | 1.3 | 1.3 | 1.3 | 1.3 | 1.3 | 1.3 |
| D/d1 | 3.3 | 3.3 | 3.3 | 3.3 | 3.3 | 3.3 | 3.3 | 3.3 | 3.5 | 3.7 | 4.0 | 3.0 | 2.8 | 2.7 |
| Flex number (times) | 53000 | 51000 | 35000 | 21000 | 59000 | 55000 | 49000 | 29000 | 55000 | 58000 | 61000 | 49000 | 45000 | 22000 |
| Terminal processability (N) | 30 | 33 | 38 | 45 | 25 | 32 | 39 | 46 | 35 | 39 | 51 | 25 | 22 | 19 |
| Comprehensive evaluation | A | A | A | C | A | A | A | C | A | A | B | A | A | B |

Referring to Table 1, the multicore cables No. 1 to No. 3, No. 5 to No. 7, and No. 9 to No. 14 in which the ratio d2/d1 of the average outer diameter d2 of the wire to the average outer diameter d1 of each core electric wire was more than 0.5 and less than 2.0 were rated as "B" or higher in the comprehensive evaluation. The multicore cables No. 1 to No. 3, No. 5 to No. 7, No. 9, No. 10, No. 12, and No. 13 in which the ratio D/d1 of the average outer diameter D of the multicore cable to the average outer diameter d1 of each core electric wire was more than 2.7 and less than 4.0 were rated as "A" in the comprehensive evaluation.

REFERENCE SIGNS LIST

1 multicore cable
2 core electric wire
2*a* insulating layer
2*b* conductor
3 wire
3*a* insulating layer

The invention claimed is:

1. A multicore cable comprising:

a first core wire composed of a pair of first core electric wires and a wire that are stranded together; and a first sheath layer disposed around the first core wire, wherein:

the first core electric wires each include a first conductor and a first insulating layer covering an outer surface of the first conductor, the wire is a stranded core electric wire including a second core wire and a second sheath layer disposed around the second core wire, the second core wire composed of a plurality of third core electric wires that are stranded together, the third core electric wires each include a third conductor and a third insulating layer covering an outer surface of the third conductor, the pair of the first core electric wires is in contact with each other, the second sheath layer is in contact with each of the pair of the first core electric wires, and a ratio d2/d1 of an average outer diameter d2 of the wire to an average outer diameter d1 of each first core electric wire is more than 0.5 and less than 2.0, where d1 is an average outer diameter of the first insulating layer of each first core electric wire, and d2 is an average outer diameter of the second insulating layer of the second core electric wire.

2. The multicore cable according to claim 1, wherein a ratio D/d1 of an average outer diameter D of the multicore cable to the average outer diameter d1 of each first core electric wire is more than 2.7 and less than 4.0.

3. The multicore cable according to claim 2, wherein the multicore cable is an automotive cable.

4. The multicore cable according to claim 1, wherein the multicore cable is an automotive cable.

5. The multicore cable according to claim 1, wherein the first conductor comprises a stranded conductor formed by stranding a plurality of element wires at a constant pitch, the plurality of element wires numbering from 196 to 2450, and each element wire having an average diameter from 40 μm to 100 μm.

6. A multicore cable comprising:

a first core wire composed of a pair of first core electric wires and a wire that are stranded together; and a first sheath layer disposed around the first core wire, wherein:

the first core electric wires each include a first conductor and a first insulating layer covering an outer surface of the first conductor, the wire is a second core electric wire including a second conductor and a second insulating layer covering an outer surface of the second conductor, the pair of the first core electric wires is in contact with each other, the second insulating layer is in contact with each of the pair of the first core electric wires, and a ratio d2/d1 of an average outer diameter d2 of the wire to an average outer diameter d1 of each first core electric wire is more than 0.5 and less than 2.0, where d1 is an average outer diameter of the first insulating layer of each first core electric wire, and d2 is an average outer diameter of the second insulating layer of the second core electric wire.

* * * * *